March 31, 1959  R. S. NORTON  2,880,391
APPARATUS AND METHOD FOR DETERMINING PHASE ANGLES
Filed Oct. 11, 1954  2 Sheets-Sheet 1

INVENTOR
Ralph S. Norton
BY
Munn, Liddy, Nathanson & March
ATTORNEYS

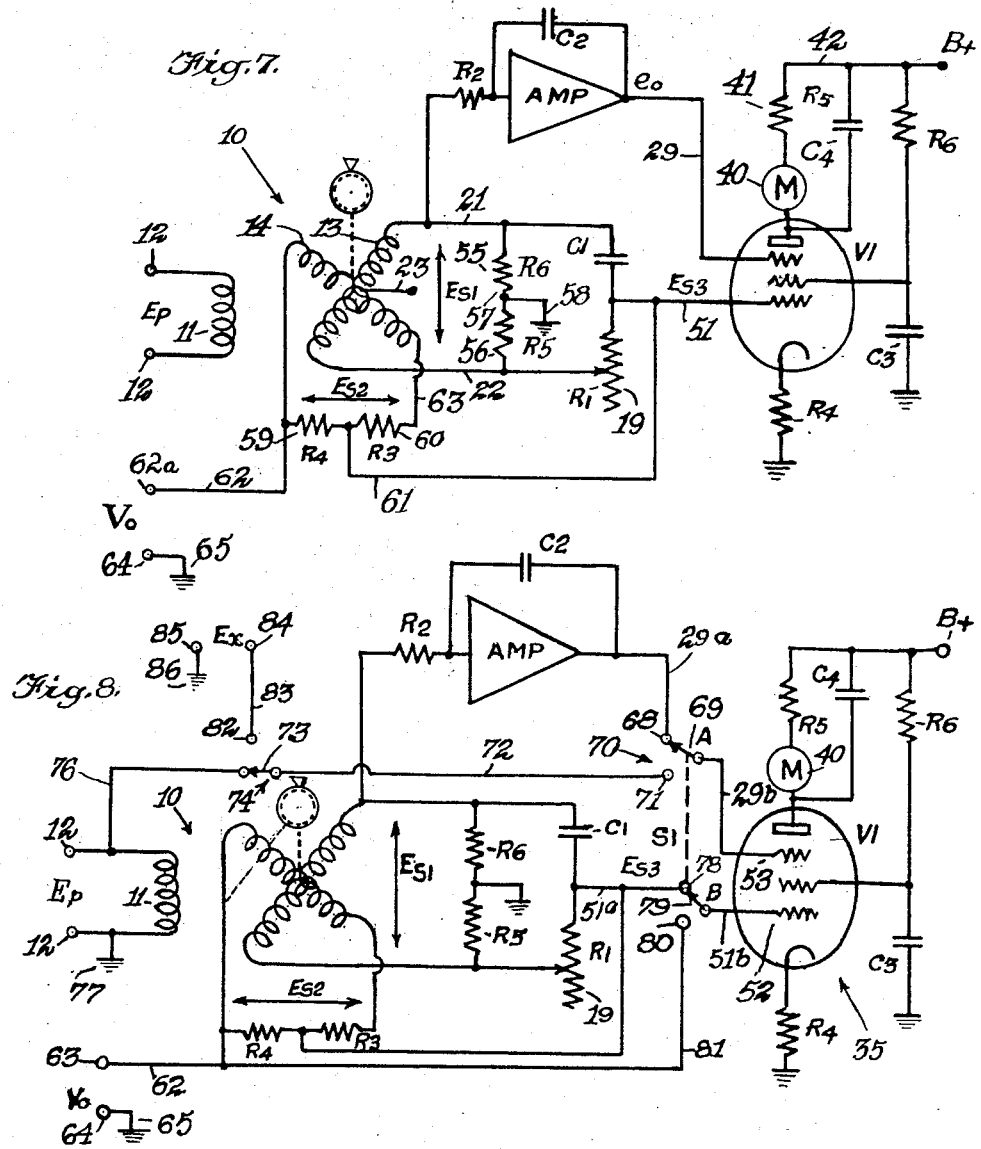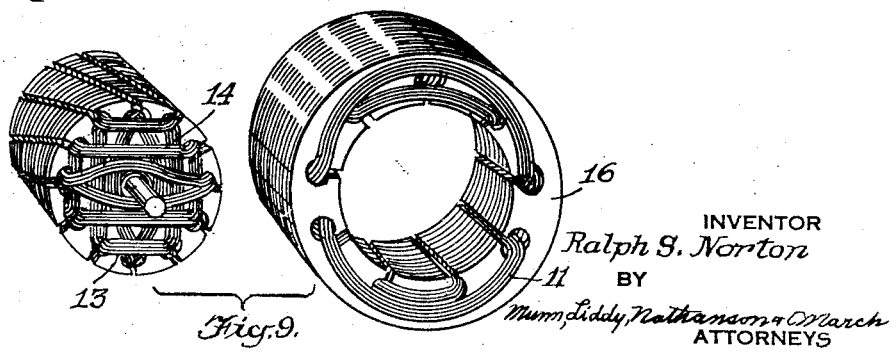

United States Patent Office 2,880,391
Patented Mar. 31, 1959

2,880,391

APPARATUS AND METHOD FOR DETERMINING PHASE ANGLES

Ralph S. Norton, Roseland, N.J., assignor, by mesne assignments, to McGraw-Edison Company, Elgin, Ill., a corporation of Delaware Application October 11, 1954, Serial No. 461,632

20 Claims. (Cl. 324—89)

This invention relates to apparatus and methods for use in connection with the phase or phase-angles of A.C. voltages.

An object of the invention is to provide an improved means and method for determining when the phase angle between two A.C. voltages of the same frequency is 90 degrees.

Another object of the invention is to provide an improved means and method for phase displacing one A.C. voltage any desired angle between zero degrees and 360 degrees from another voltage of the same frequency, or in other words, for causing a known phase-angle shift in an A.C. voltage.

Still another object of the invention is to provide an improved means and method for determining what phase angle exists between two A.C. voltages of the same frequency.

A feature of the invention resides in the provision of improved means and methods for determining phase angles and for phase shifting voltages, which are independent of amplitude or frequency of the voltages within wide limits.

Other features of the invention reside in the provision of an improved apparatus as above set forth, which is easy to operate and provides phase angle indications without requiring information as to the frequencies of the A.C. voltages.

A still further object of the invention is to provide an improved apparatus in accordance with the foregoing, which is simple and compact in construction, economical to fabricate, accurate in its operation over a wide range of frequencies, provides continuous indications of the phase angle, requires relatively low power consumption, and is adaptable for use with input voltages varying in magnitude over a wide range.

Other features and advantages will hereinafter appear.

In the accompanying drawings:

Fig. 7 is a schematic diagram of an apparatus made in accordance with the invention, incorporating the diagram of Fig. 5, which may be utilized to phase shift an A.C. voltage or signal through any angle from zero to 360 degrees, the phase angle at any time being known or indicated.

Fig. 8 is a schematic diagram of an apparatus made in accordance with the invention and incorporating the diagram of Fig. 7, by which the phase angle existing between two A.C. voltages of the same frequency may be quickly and accurately determined or indicated.

Fig. 9 is a perspective view of separated stator and rotor sections of an induction resolver of the type employed in the apparatus of the invention.

Figure 5:
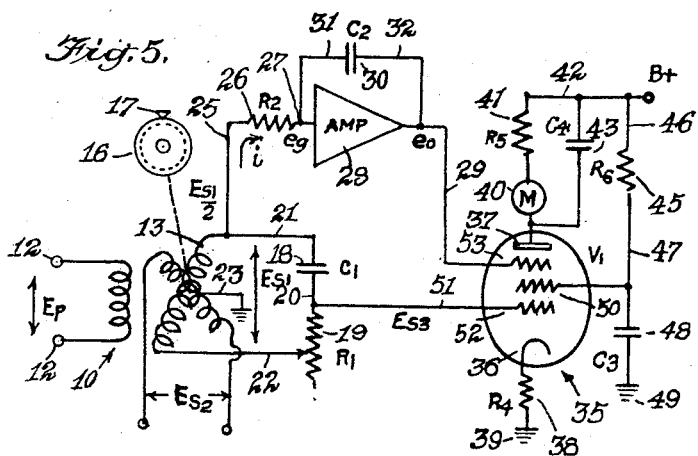
Fig. 5 is a schematic diagram of an apparatus made in accordance with the invention, by which determinations may be had when two A.C. voltages are exactly in quadrature with each other.

Referring first to the apparatus represented in Fig. 5, by which it may be determined when two A.C. voltages of the same frequency are in quadrature, there is shown an induction resolver generally designated by the numeral 10, having a primary winding 11 connected to circuit means comprising terminals 12 by which an A.C. voltage $E_p$ may be applied to the winding for energization thereof.

Figure 1:
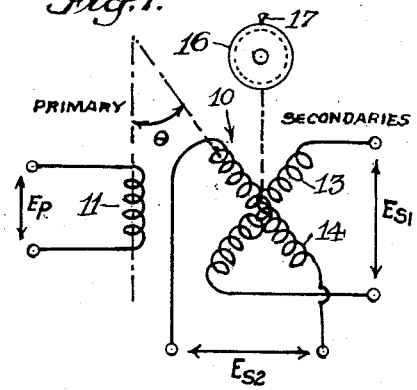
Figure 1 is a schematic diagram of an induction resolver of the type used in the apparatus and method of the invention, said resolver having two secondary windings disposed at 90 degrees to each other.

As shown in Figs. 1, 5 and 9, the induction resolver 10 has two secondary windings 13 and 14 disposed in 90 degree relation to each other on a laminated iron rotor form 15. The primary winding 11 of the induction resolver is carried by a laminated iron stator form 16.

The induction resolver 10 is so arranged and constructed that it will have induced voltages $E_{s1}$ and $E_{s2}$ induced respectively in the secondary windings 13 and 14, which are in phase with each other and vary inversely in magnitude as the rotor 15 is turned, and that a sinusoidal relationship exists between the secondary voltages and the angular position of the rotor 15. It is understood that the coupling between the rotor and stator, or primary and secondary windings may be varied continuously through 360 degrees by mechanical rotation of the rotor, accomplished by a graduated dial 16 laid out for 360 degrees and associated with a settable index mark 17.

In the appended claims the induction resolver 10 is at times referred to as a first means producing a first A.C. voltage, which latter may be the voltage $E_{s1}$.

In connection with the induction resolver 10 the following voltage relationships will exist:

If $|E_{s1}|$ is expressed as:

$$|E_{s1}|=|KE_p \sin \theta|$$

where $K$=the transformation ratio, then $$|E_{s2}|=|KE_p \cos \theta|$$

Figure 2:
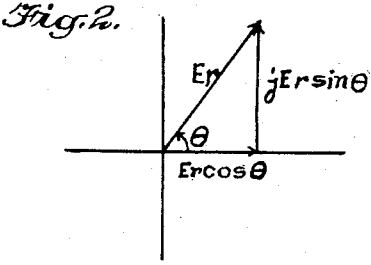
Fig. 2 is a phasor diagram illustrating the well-known resolution of a voltage into horizontal and vertical components.
Figure 4:
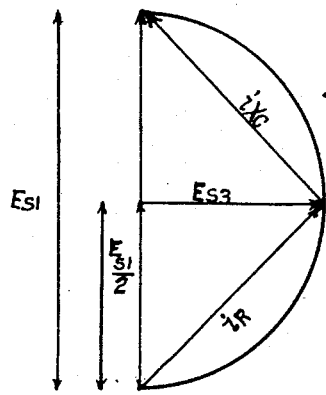
Fig. 4 is a phasor diagram of secondary voltages of the circuit of Fig. 3.

It is understood, of course, as illustrated in Fig. 2, that any voltage may be resolved into components with respect to some reference. In Fig. 2 the phasor $E_r$ may be expressed as:

$$E_r=E_r \cos \theta + jE_r \sin \theta$$

If the above equation is to be realized with the induction resolver of Fig. 1, the induced output voltage $E_{s1}$ must be phase-shifted or converted to a time quadrature voltage, and this latter added to the induced voltage $E_{s2}$.

Figure 3:
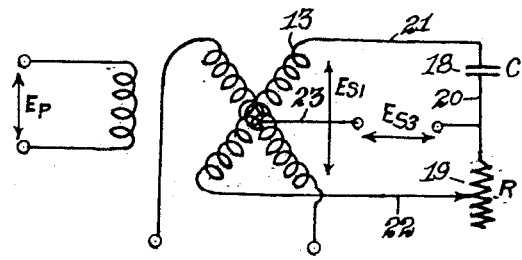
Fig. 3 is a schematic circuit diagram showing the induction resolver of Fig. 1 with one secondary winding connected to a phase shifting network by which the induced voltage may be phase-shifted 90 degrees. The secondary winding is shown as being center tapped.

Phase shifting of the induced voltage $E_{s1}$ is accomplished by an adjustable means comprising a network having a capacitor 18 and series-connected resistor 19 which are joined to each other by a wire 20 and joined by wires 21 and 22 to the ends of the secondary winding 13. If, as indicated in Fig. 3, a center tap 23 be brought out from the winding 13, the voltage $E_{s3}$ between the center tap and the wire 20 may be brought into quadrature with the induced voltage $E_{s1}$ of the winding 13. Such phasing may be readily accomplished by adjustment of the resistor 19.

The following relationships exist in the circuit of Fig. 3, considering the capacitor 18 and resistor 19 as having respectively the symbols C and R. If $$R = \frac{1}{WC}$$

where W equals the frequency in radians per second, equalling 2 pi $f$ where $f$ equals the frequency in c.p.s.), the voltage across the resistor 19 is equal to that across the capacitive reactance 18; then $$E_{s3} = \frac{E_{s1}}{2} \underline{|-90 \text{ degrees}}$$

It is understood that, to preserve this 90 degree relationship, if the frequency W is changed, either R or C must be changed accordingly.

Figure 6:
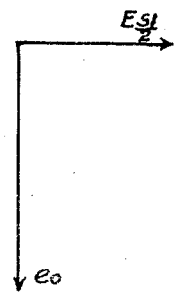
Fig. 6 is a phasor diagram illustrating a voltage relationship existing in the circuit of Fig. 5.

In accordance with this invention means are provided, one form of which is illustrated in Fig. 5, by which it may be accurately determined when the phase-shifted voltage $E_{s3}$ is exactly in quadrature with the induced voltage $E_{s1}$. In this figure, the center tap 23 of the secondary winding 13 is grounded and a wire 25 leading from the wire 21 connects with a resistor 26 which is connected by a wire 27 to the grid (not shown) of a phase-shifting means comprising high gain amplifier 28 whose output is connected to a wire 29. Bridging the amplifier 28 is a capacitor 30 connected by wires 31 and 32 respectively to the wires 27 and 29. The amplifier 28 is characterized as having a very high gain and suffering little change in phase-shift at any frequency within a predetermined range for which the present apparatus is intended to operate. As a consequence, the output voltage $e_o$ of the amplifier 28 will for all frequencies be phase-displaced or phase-shifted 90 degrees with respect to the input voltage $$\frac{E_{s1}}{2}$$

or in time quadrature therewith. This relationship is shown in the phasor diagram of Fig. 6.

Considering the circuit associated with the amplifier 28, the following relations will apply: The voltage $e_g$ which is impressed on the grid of the amplifier 28 may be considered as fixed and zero. If the voltage $$\frac{E_{s1}}{2}$$

of the wire 25 is applied to the resistor 26 (labeled $R_2$ in the following equation), a current $i$ will flow of the following value:

$$i = \frac{E_{s1}}{2R_2}$$

With $e_g$ fixed at zero, the current $i$ must flow through the capacitor 30 (labeled $C_2$ in the following equation). Therefore $$i = e_o j W C_2$$

Equating these, there is obtained:

$$i = \frac{E_{s1}}{2R_2} = e_o j W C_2$$

The absolute value of the gain of the amplifier 28 is:

$$|G| = \left|\frac{e_o}{E_{s1}/2}\right| = \frac{1}{WR_2C_2}$$

It will be understood from the above that the amplitude of the 90 degree phase-shifted voltage $e_o$ is a function of frequency as well as the magnitude of the voltage $$\frac{E_{s1}}{2}$$

The resolver secondary 13, phase-shifting means 18, 19, and amplifier 28, with associated wires, may be considered as a circuit network providing the voltages $E_{s3}$ and $e_o$.

In accordance with the invention the voltages $e_o$ and $E_{s3}$, which are in time quadrature to the voltage $E_{s1}$, are applied to an indicator which will accurately indicate the phase relationship of these voltages. This indicator comprises a uniformly-energized valved circuit and a valve means in said circuit, which is responsive to the impressed quadrature voltages.

Referring to Fig. 5, the valve means comprises a gated-beam vacuum tube 35, having a cathode 36 and an anode 37 comprising part of the valved circuit. The tube 35 has multiple grids and may be of the type known commercially as 6BN6, which exhibits a limiting action in its plate current for applied signals, thus contributing to the condition that the amplitude of the applied signals has negligible effect on the location of dips in the anode or plate current.

The cathode 36 is connected by a resistor 38 to a ground 39. The anode 37 is connected to a D.C. meter 40 which is connected to a resistor 41 in turn connected to a wire 42 which is supplied with a uniform B+ voltage. The resistor 38 fixes the bias at which the tube 35 operates, and the resistor 41 and meter 40 comprise the plate load of the tube 35.

A capacitor 43 is connected between the anode 37 and the wire 42, and bypasses signal currents from the meter 40, since with the present apparatus it is intended that the meter respond only to D.C. plate current. A resistor 45 is connected by a wire 46 to the B+ wire 42, and by a wire 47 to a capacitor 48 which is connected to a ground 49. The wire 47 is connected to the accelerator grid 50 of the tube 35, and this accelerator is energized to proper value by the resistor 45. The capacitor 48 bypasses signal currents from the accelerator 50, holding the voltage of the accelerator constant.

The voltages $E_{s3}$ and $e_o$ are impressed on the valve 35 by connecting a wire 51 from the wire 20 to the control or limitor grid 52 of the tube 35, and by connecting the wire 29 to the quadrature grid 53 of the tube 35.

With the above construction, the D.C. plate current which will be shown by the meter 40 may be used as a measure of the time-phase coincidence of the two applied signal voltage $E_{s3}$ and $e_o$. If the phase angle of $E_{s3}$ with respect to $e_o$ (and thus with respect to $E_{s1}$) changes, the D.C. plate current in the meter 40 will change. If $E_{s3}$ is either 90 degrees leading or 90 degrees lagging $$\frac{E_{s1}}{2}$$

the plate current in the meter 40 will be either a maximum or a minimum, depending on whether $e_o$ is in phase or 180 degrees out of phase with $E_{s3}$. By interchanging the positions of the capacitor 18 and resistor 19, the voltages $E_{s3}$ and $e_o$ may be compared either as to phase or phase opposition, and thus either a dip or a peak in the plate current flowing through the meter 40 may be chosen, to adjust to. Because of the limiting action of the tube 35 the amplitude of the applied signals $E_{s3}$ and $e_o$ will have negligible effect on the location of the current inflection. The observable difference between operation with either large or small input signals is in the range of plate current as one of the two applied signals is caused to shift through a full 360 degree phase angle with respect to the other. I have found it is not necessary for a limiting action to take place for successful performance of my apparatus, since the actual value of the plate current is of no consequence. What is of importance is whether the plate current is either at a maximum or at a minimum, thus indicating if the voltages $e_o$ and $E_{s3}$ are either in phase or in phase opposition.

Accordingly, with the circuit of Fig. 5, it will be readily understood that adjustment of the resistor 19 can be made to bring the voltages $E_{s1}$ and $E_{s3}$ exactly in quadrature with each other, and this will be indicated by the meter 40 showing either a maximum or a minimum current, depending on whether the voltages $E_{s3}$ and $e_o$ are in phase with each other or in phase opposition. The operation of the circuit of Fig. 5 is accurate and reliable, and it may be quickly determined by adjusting the resistor 19 and observing the meter 40 when a quadrature relation exists between the voltages $E_{s1}$ and $E_{s3}$.

In the appended claims the voltage $E_{s1}$ is sometimes referred to as a first A.C. voltage, the voltage $E_{s3}$ sometimes referred to as a second A.C. voltage, and the voltage $e_o$ sometimes referred to as a third A.C. voltage.

When the voltage $E_{s3}$ is exactly in quadrature with the voltage $E_{s1}$ it may be readily combined with the voltage $E_{s2}$ of the secondary winding 14, as explained previously, and I utilize this to provide a means for phase shifting a given A.C. voltage or signal, and also for determining what phase angle exists between two independent A.C. voltages of the same frequency.

In accomplishing the above I incorporate the circuit of Fig. 5 in an apparatus represented by the circuit of Fig. 7. In these two figures like components have been given like characters. In Fig. 7 the center tap 23 of the secondary winding 13 is left disconnected, and equal, series-connected resistors 55 and 56 are provided, having a common connection 57 joined to a ground 58. The resistors 55 and 56 are connected to the wires 21 and 22, and replace the ground connection which was previously made to the center tap 23. Also, equal, series-connected resistors 59 and 60 are provided, having a common connection joined to a wire 61 which connects to the wire 51. The resistors 59 and 60 are connected respectively to wires 62 and 63 joined to the ends of the secondary winding 14. The wire 62 leads to a voltage output terminal 62a, and a second voltage output terminal 64 is connected to a ground 65.

By the above arrangement, the voltage $E_{s3}$ is combined with the voltage $$\frac{E_{s2}}{2}$$

from the secondary winding 14, to produce a resultant induced or output voltage $V_o$, and these combined voltages may be brought in time quadrature by adjustment of the resistor 19 while observing the meter 40, such adjustment effecting a quadrature relationship between the voltages $E_{s3}$ and $E_{s1}$ as above described. With the apparatus of Fig. 7, the output voltage $V_o$ may be phase shifted through all angles from zero to 360 degrees with respect to any fixed reference voltage, by merely turning a control, which here is the rotor and dial 16 of the induction resolver 10, and a proportionate relationship exists, in that shifting of the rotor any given specified number of degrees will result in the same number of degrees of shift in the phase angle of the output voltage $V_o$. Thus I provide by this apparatus a simple and quick means and method for phase-shifting a given A.C. voltage or signal any desired, known amount.

In accordance with the present invention I utilize the apparatus of Fig. 7 by which a signal may be phase-shifted any known amount, to determine quickly and accurately the phase relationship which exists between any two independent A.C. voltages of the same frequency. I accomplish this by an apparatus as represented by the circuit of Fig. 8. In this figure the circuit of Fig. 7 is incorporated, and like components have been given identical characters.

In Fig. 8 the wire 29 is replaced by wires 29a and 29b connected respectively to a contact 68 and blade 69 of a switch means comprising a double-pole, double-throw switch 70. A second contact 71 of the switch 70 is connected to a voltage take-off connection comprising a wire 72 and a blade 73 of a single-pole, double-throw switch 74 which has a contact 75 connected by a wire 76 to one of the terminals 12 of the primary winding 11. The other terminal 12 of the primary winding is connected to a ground 77.

The wire 51 is replaced by wires 51a and 51b connected respectively to another contact 78 and another blade 79 of the switch 70. The remaining contact 80 of the switch 70 is connected by a wire 81 to the wire 62. The remaining contact 82 of the switch 74 is connected by a wire 83 to an input circuit comprising one terminal 84 of a pair, the other terminal 85 of which is connected to a ground 86. The input terminals 84 and 85 are for the purpose of connecting an independent A.C. voltage to the apparatus of Fig. 8, whose phase angle with respect to the voltage $E_p$ is to be measured.

Operation of the apparatus of Fig. 8 is as follows: With the primary 11 of the induction resolver 10 energized, the switch 70 is placed in the position shown and the resistor 19 varied to cause the meter 40 to indicate either a maximum or a minimum. This brings the voltage $E_{s3}$ exactly in time quadrature with the voltage $E_{s1}$ and in time quadrature with the voltage $E_{s2}$. The switch 70 is now shifted to its lower position and the rotor of the induction resolver 10 is rotated until the meter 40 again indicates a maximum or minimum value. This will signify that the output voltage $V_o$ and the energizing voltage $E_p$ are exactly in phase. The movable index mark 17 associated with the dial 16 may be shifted to show a reading of zero for the rotor position of the induction resolver 10, for this condition. The switch 74 is now shifted to its upper position. This will impress instead of the voltage $E_p$ the unknown voltage $E_x$ on the quadrature grid 53 of the tube 35, together with the output voltage $V_o$ on the limiter grid 52. The rotor of the induction resolver 10 is again turned to cause the meter 40 to indicate a maximum or minimum. When this occurs it will signify that the voltages $E_x$ and $V_o$ are in phase with each other. The dial 16 on the rotor of the induction resolver may now be read, referring to the previously set index mark, and the degrees which are indicated will be an accurate measure of the phase difference between the independent voltages $E_p$ and $E_x$.

It will be appreciated that the above measurements are made without knowledge of the frequencies of the voltages which have been compared. The comparison may be quickly and easily accomplished with the exercise of but little skill. The apparatus is relatively small and compact, of simple construction and utilizes inexpensive components while at the same time providing a desirable accuracy.

It can be seen that a continuous reading is had of the phase angle difference, since the dial indicating the rotor position of the induction resolver 10 is not fluctuating and is at all times in view.

It should be understood that the invention is not limited to the specific embodiments thereof illustrated herein. For example, a preamplifier may be employed to boost the signal to the primary coil 11 of the induction resolver, a different phase shifting organization may be employed in place of the capacitor 18 and resistor 19, etc.

In connection with Fig. 8, the following relations will be found to exist:

$$V_o = \frac{E_{s2}}{2} + j\frac{E_{s1}}{2}$$

or $$V_o = \frac{KE_p \cos\theta}{2} + j\frac{KE_p \sin\theta}{2}$$

where K is the transformation ratio. This is equivalent to:

$$V_o = \frac{KE_p}{2} \underline{|\theta}$$

where $\theta$ is the phase angle determined by the rotor position.

Also, a phase shift may occur between the exciting voltage $E_p$ and the induced voltage in the secondary windings of the induction resolver. If this phase shift is $\phi$, then $$V_o = \frac{KE_p}{2} \underline{|\theta - \phi}$$

If the dial marked in mechanical degrees and affixed to the resolver rotor shaft is observed, the phase shift introduced by the resolver induction may be read, with the exception that $\phi$ in the above equation is unknown.

Since $\phi$ may be considered as fixed for any particular frequency, incremental readings taken from the dial will be quite accurate, i.e., moving the dial 60 degrees will shift the phase angle of $V_o$ by 60 degrees, etc.

The unknown $\phi$ is removed by use of the circuit of Fig. 8. In the "up" position of the switch 70, as shown, the circuit of Fig. 8 is equivalent to that of Fig. 7. In the "down" position of switch 70, the output voltage $V_o$ is applied to the limiter grid 52 of tube 35, and the excitation signal $E_p$ is applied to the quadrature grid 53 of tube 35. A maxima in the plate current may be searched for on the meter 40 by now rotating the resolver dial. Once located, the index mark 17 of the dial 16 may be moved to align it with zero degrees on the dial. Effectively the last equation as far as the observer is concerned, has reduced to $$V_o = \frac{KE_p}{2} \underline{|\theta}$$

With the dial 17 zeroed it can now be understood that instead of connecting to voltage $E_p$ in this last position of the switch 74, the switch 74 can be thrown up to impress any other voltage of the same frequency on the quadrature grid 53, and the phase angle of this new voltage with respect to $E_p$ determined by rotating the resolver dial 17 and by observing the meter 40.

Variations and modifications may be made within the scope of the claims and portions of the improvements may be used without others.

I claim:

1. The method of indicating the phase relationship between two independent A.C. voltages of the same frequency, which includes the steps of producing from one of said voltages a resultant inducted voltage whose phase angle with respect to said one voltage may be varied from zero to 360 degrees by varying proportionately the position of a control within a 360 degree range, impressing the said one voltage and the said resultant induced voltage on an indicator adapted to show by a determinate designation when said impressed voltages are in phase, bringing the resultant induced voltage in phase with said one voltage by turning said control to a position within said range as determined by said determinate designation of the indicator, impressing the resultant induced voltage and the other of the independent voltages on said indicator, bringing the resultant induced voltage in phase with the other of the independent voltages by turning the control to another position within said range as determined by the said determinate designation of the indicator, and measuring the difference between the two positions of the control.

2. The method of indicating the phase relationship between two independent A.C voltages of the same frequency, which includes the steps of producing from one of said voltages a resultant induced voltage whose phase angle with respect to said one voltage may be varied from zero to 360 degrees by varying proportionately the position of a control within a 360 degree range, bringing the inducted voltage in phase with said one voltage by turning said control to a position within said range, bringing the induced voltage in phase with the other of the two A.C. voltages by turning the control to another position within said range, and measuring the difference between the two positions of the control.

3. The method of indicating when two A.C voltages of the same frequency are in quadrature, which includes the steps of producing from one of said voltages a phase-displaced voltage which is exactly in quadrature with said one voltage, uniformly energizing a circuit having a valve which controls the flow of current in said circuit, impressing said phase-displaced voltage and the other of said A.C. voltages simultaneously on said valve to activate the latter in accordance with the sum of said impressed voltages, shifting the phase of one of said A.C. voltages with respect to the other to cause either a maximum or minimum of current to flow in said circuit when the impressed voltages are either in phase or in phase opposition respectively; and continuously measuring the value of the current in said circuit, said A.C. voltages being in quadrature when the value of said current is either a maximum or a minimum.

4. The method of indicating when two A.C. voltages of the same frequency are in phase or phase opposition, which includes the steps of uniformly energizing a valved circuit having a valve which controls the flow of current in said circuit, impressing said voltages simultaneously on said valve to activate the latter in accordance with the sum of said impressed voltages, shifting the phase of one of said A.C. voltages with respect to the other to cause either a maximum or minimum of current to flow in said valved circuit when the voltages are in phase or in phase opposition respectively, and continuously indicating the value of the current in said circuit.

5. The method of determining the phase relationship between two independent A.C. voltages of the same frequency, which includes the steps of energizing with one of said independent voltages the primary winding of an induction resolver having a rotor and two secondary windings disposed at 90 degrees to each other whereby inversely variable voltages in phase will be induced in the said secondary windings, producing from a first one of the induced voltages a second and phase-displaced A.C. voltage which may be brought into quadrature with the first voltage for various frequencies, producing from said first induced voltage a third and phase-displaced A.C. voltage which is exactly in quadrature to the first induced voltage regardless of frequency, within limits, matching the phase positions of said second and third phase-displaced voltages to bring into phase the second displaced voltage and the other of the induced voltages, and combining the latter two to produce a resultant induced voltage the phase position of which may be varied 360 degrees by turning said rotor, impressing said one A.C. voltage and said resultant induced voltage on an indicator adapted to show by a determinate designation when both said impressed voltages are in phase, bringing the resultant induced voltage in phase with said one A.C. voltage by turning said rotor to a given position as determined by said determinate designation of the indicator, impressing the resultant induced voltage and the other of the independent A.C. voltages on said indicator, bringing the resultant induced voltage in phase with the other of the independent voltages by turning said rotor to another given position as determined by said determinate designation of the indicator, and measuring the difference between the two positions of the rotor.

6. Apparatus for determining the phase relationship between two independent A.C. voltages of the same frequency, comprising circuit means for connection to one of said voltages; means connected to said circuit means, adapted to be excited by said one voltage and including an induction resolver having a rotor, for providing a resultant induced voltage whose phase angle with respect to said one voltage may be varied from zero to 360 degrees by varying proportionately the position of said rotor with a 360 degree range; a voltage take-off connection from said circuit means; an input circuit for connection to said second A.C. voltage; indicator means rsponsive to said resultant induced voltage and responsive additionally to another A.C. voltage, for indicating when the said voltages are in phase; means for connecting either said take-off connection or said input circuit to said indicator means to cause the latter to be responsive to either the said one or the other of the A.C. voltages, thereby to enable the resultant induced voltage to be brought into phase with either of said two A.C. voltages by employing different positionings of the rotor; and means enabling the difference in the said positionings of the rotor to be measured.

7. The invention as defined in claim 6 in which the induction resolver has two secondary windings disposed at 90 degrees to each other, and in which there is adjustable means producing from the induced voltage of one secondary winding a phase-displaced voltage in quadrature with said induced voltage, said phase-displaced voltage and the induced voltage of the other secondary winding being combined to produce the said resultant induced voltage.

8. The invention as defined in claim 7 in which there is switch means cooperable with said indicator means, enabling alternative operation of the latter to indicate when the said phase-displaced voltage is in quadrature with the induced voltage of the one secondary winding.

9. In combination, a first means producing a first A.C. voltage; adjustable means connected to said first means, providing from said first voltage a phase-displaced second A.C. voltage which may be brought into quadrature with the first voltage for various frequencies; means providing from said first voltage a third A.C. voltage exactly in quadrature to the first voltage regardless of frequency, within limits; a uniformly-energized valved circuit; valve means in said valved circuit, connected to said means providing the second and third voltages and responding to said voltages for controlling the flow of current in the valved circuit, said valve means causing either maximum or minimum current to flow when the second and third voltages are brought either into phase or phase opposition by said adjustable means, thus giving evidence that the second A.C. voltage is in quadrature to the first voltage.

10. The invention as defined in claim 9 in which the means providing the third A.C. voltage comprises a high-gain amplifier and a capacitor bridging said amplifier.

11. In combination, an induction resolver having a primary winding for energization from a source of alternating current, and two secondary windings disposed at 90 degrees to each other; adjustable means connected to one of the secondary windings, providing a second and phase displaced A.C. voltage which may be brought into quadrature with the induced voltage of said one winding for various frequencies; means providing from said induced voltage of the one winding a third phase-displaced A.C. voltage substantially in quadrature with the induced voltage regardless of frequency, within limits; a uniformly-energized valved circuit, having current-indicating means; valve means in said valved circuit, connected to said means providing the second and third voltages and responding to said voltages for controlling the flow of current in the valved circuit, said valve means causing either maximum or minimum current to flow when the second and third voltages are brought either into phase or phase opposition by said adjustable means; and circuit means connecting said adjustable means and other secondary winding to provide a resultant induced output voltage, from the second A.C. voltage and the induced voltage of the other secondary winding, whose phase position shifts with turning of the said rotor.

12. The invention as defined in claim 11 in which there are switching means for applying the primary impressed voltage and the said output voltage to the valve means instead of said second and third voltages, thereby to enable an indication to be had when the output voltage is brought in phase with the primary voltage by turning of the rotor to a given position.

13. The invention as defined in claim 12 in which there are input circuit means for connection to an independent A.C. voltage, and switching means for connecting said input circuit means to the valve means to replace the primary impressed voltage with said independent voltage, thereby to enable an indication to be had when the output voltage is brought in phase with the independent voltage by turning of the rotor to another given position.

14. The invention as defined in claim 13 in which there are means enabling the difference in the given positions of the rotor to be measured, thereby indicating the phase angle between the primary energizing voltage and the independent voltage.

15. The invention as defined in claim 12 in which there are input circuit means for connection to an independent A.C. voltage, and switching means for connecting said input circuit means to said first-mentioned switching means so as to apply the independent voltage to the valve means, thereby to enable an indication to be had when the output voltage is brought in phase with the independent voltage by turning of the rotor to another given position.

16. The invention as defined in claim 11 in which there is a sinuscidal relation between the induced voltages of the induction resolver and the angular position of the rotor, and in which the phase position of the said resultant induced output voltage shifts proportionately with turning of the said rotor.

17. The invention as defined in claim 11 in which the circuit means includes a pair of equal, series-connected resistors bridging said other secondary winding, the common connection of said resistors being connected to said adjustable means, and includes a terminal connected to one end of said other secondary winding, providing one connection for said output voltage.

18. In combination, means including a circuit network, providing two A.C. voltages of the same frequency, adjustable means for shifting the phase of one of said voltages; a uniformly-energized valved circuit; valve means in said valved circuit, connected to said network and responding to said voltages for controlling the flow of current in the valved circuit, said valve means causing either maximum or minimum current to flow when the voltages are brought either in phase or in phase opposition respectively by said adjustable means; and indicator means in said valved circuit, for indicating said maximum or minimum values of current.

19. The invention as defined in claim 18 in which there is a second phase-shifting means producing the other of said voltages from an impressing voltage substantially in quadrature with said other voltage whereby when the indicator means shows a maximum or minimum it will signify that the said one voltage and the impressing voltage are in quadrature.

20. The invention as defined in claim 19 in which the second phase-shifting means comprises a high-gain amplifier whose phase-shifting function is substantially independent of frequency.

References Cited in the file of this patent

UNITED STATES PATENTS

| | | |
|---|---|---|
| 1,667,497 | Shapiro | Apr. 24, 1928 |
| 2,403,527 | Hershberger | July 9, 1946 |
| 2,517,805 | Spindler | Aug. 8, 1950 |